(12) United States Patent
Fendler et al.

(10) Patent No.: US 11,654,907 B2
(45) Date of Patent: May 23, 2023

(54) LIMITING A TARGET VALUE FOR A CONTROL VARIABLE OF A DRIVER ASSISTANCE SYSTEM

(71) Applicant: Bayerische Motoren Werke Aktiengesellschaft, Munich (DE)

(72) Inventors: Tamas Fendler, Krailing (DE); Robert Knorrn, Oberhaching (DE); Thomas Velten, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 108 days.

(21) Appl. No.: 17/267,293

(22) PCT Filed: Jul. 24, 2019

(86) PCT No.: PCT/DE2019/100682
§ 371 (c)(1),
(2) Date: Feb. 9, 2021

(87) PCT Pub. No.: WO2020/030218
PCT Pub. Date: Feb. 13, 2020

(65) Prior Publication Data
US 2021/0316725 A1    Oct. 14, 2021

(30) Foreign Application Priority Data
Aug. 10, 2018    (DE) ............... 10 2018 213 471.5

(51) Int. Cl.
*B60W 30/14*    (2006.01)
*B60W 60/00*    (2020.01)
(Continued)

(52) U.S. Cl.
CPC ...... *B60W 30/143* (2013.01); *B60W 50/0097* (2013.01); *B60W 50/0205* (2013.01);
(Continued)

(58) Field of Classification Search
CPC .......... B60W 30/143; B60W 50/0097; B60W 50/0205; B60W 50/0225; B60W 60/001;
(Continued)

(56) References Cited

U.S. PATENT DOCUMENTS 6,648,426 B1    11/2003    Boettiger et al.
7,548,812 B2 *   6/2009    Guenthner ........... B60K 31/047
                                                     123/363

(Continued)

FOREIGN PATENT DOCUMENTS

DE    198 12 238 A1    9/1999
DE    101 50 421 A1    4/2003
(Continued)

OTHER PUBLICATIONS

WO-9920508-A1 translation (Year: 1999).*
(Continued)

*Primary Examiner* — Jeff A Burke
*Assistant Examiner* — Kyle T Johnson
(74) *Attorney, Agent, or Firm* — Crowell & Moring LLP

(57) ABSTRACT

A driver assistance system is configured to determine or receive a setpoint value for a control variable of the motor vehicle, to determine or receive an actual value for the control variable of the motor vehicle, to determine a correction value for reducing a deviation between the setpoint value for the control variable and the actual value for the control variable depending on the deviation between the setpoint value for the control variable and the actual value for the control variable, to compare the correction value with a first threshold value, and at least to limit a future change in the setpoint value for the control variable which increases the deviation between the target value for the control vari- (Continued)

able and the actual value for the control variable depending on the comparison of the correction value with the first threshold value.

6 Claims, 1 Drawing Sheet

(51) Int. Cl.
*B60W 50/00* (2006.01)
*B60W 50/02* (2012.01)

(52) U.S. Cl.
CPC ...... *B60W 50/0225* (2013.01); *B60W 60/001* (2020.02); *B60W 2050/0008* (2013.01); *B60W 2050/0083* (2013.01); *B60W 2050/0215* (2013.01); *B60W 2540/18* (2013.01); *B60W 2720/106* (2013.01)

(58) Field of Classification Search
CPC . B60W 2050/0008; B60W 2050/0083; B60W 2050/0215; B60W 2540/18; B60W 2720/106; B60W 50/0098; B60W 2720/10; B60Y 2300/143
See application file for complete search history.

(56) References Cited

U.S. PATENT DOCUMENTS

| | | | |
|---|---|---|---|
| 2004/0040765 A1 | 3/2004 | Satou et al. | |
| 2005/0021211 A1* | 1/2005 | Guenthner | B60K 31/047 180/170 |
| 2011/0301815 A1* | 12/2011 | Koukes | B62D 15/0245 701/42 |
| 2012/0203440 A1* | 8/2012 | Matsunaga | B60T 7/12 701/93 |
| 2013/0190986 A1* | 7/2013 | Nishimori | B60W 10/20 701/41 |
| 2018/0265090 A1* | 9/2018 | Sharma | B60W 50/06 |
| 2019/0276016 A1* | 9/2019 | Giorelli | B60W 30/10 |
| 2019/0338849 A1* | 11/2019 | Chunodkar | B60W 30/182 |
| 2020/0114917 A1* | 4/2020 | Oguro | B60W 30/181 |

FOREIGN PATENT DOCUMENTS

| | | | | |
|---|---|---|---|---|
| DE | 103 12 185 A1 | 3/2004 | | |
| DE | 103 11 191 A1 | 9/2004 | | |
| DE | 10 2012 025 036 A1 | 6/2014 | | |
| DE | 10 2015 001 971 A1 | 8/2016 | | |
| JP | 2005-523835 A | 8/2005 | | |
| KR | 10-2017-0011154 A | 2/2017 | | |
| WO | WO-9920508 A1 * | 4/1999 | ......... B60K 31/0008 |
| WO | WO 00/06411 A2 | 2/2000 | | |
| WO | WO-2011077050 A1 * | 6/2011 | ............ B62D 6/005 |

OTHER PUBLICATIONS

WO-2011077050-A1 translation (Year: 2011).*
Korean-language Office Action issued in Korean Application No. 10-2021-7001503 dated Mar. 1, 2022 with English translation (nine (9) pages).
International Search Report (PCT/ISA/210) issued in PCT Application No. PCT/DE2019/100682 dated Nov. 8, 2019 with English translation (five (5) pages).
German-language Written Opinion (PCT/ISA/237) issued in PCT Application No. PCT Application No. PCT/DE2019/100682 dated Nov. 8, 2019 (five (5) pages).
German-language Search Report issued in German Application No. 10 2018 213 471.5 dated Jan. 14, 2019 with partial English translation (11 pages).

* cited by examiner

LIMITING A TARGET VALUE FOR A CONTROL VARIABLE OF A DRIVER ASSISTANCE SYSTEM

BACKGROUND AND SUMMARY OF THE INVENTION

The invention relates to a driver assistance system and to a method for limiting a setpoint value for a control variable of a driver assistance system.

Within the scope of the document, the term "automated driving" can be understood to mean driving with automated longitudinal or transverse guidance or autonomous driving with automated longitudinal and transverse guidance. The term "automated driving" comprises automated driving with any desired level of automation. Exemplary levels of automation are assisted, partially automated, highly automated or fully automated driving. Said levels of automation have been defined by the German Federal Highway Research Institute (BASt) (see BASt publication "Forschung kompakt", November 2012 edition). In the case of assisted driving, the driver carries out the longitudinal or transverse guidance permanently, whereas the system assumes the respective other function within certain limits. In the case of partially automated driving (TAF), the system assumes the longitudinal and transverse guidance for a certain time period and/or in specific situations, it being necessary for the driver to monitor the system permanently as in the case of assisted driving. In the case of highly automated driving (HAF), the system assumes the longitudinal and transverse guidance for a certain time period, without it being necessary for the driver to monitor the system permanently; the driver has to be capable, however, of assuming the vehicle guidance within a certain time. In the case of fully automated driving (VAF), the system can automatically manage the driving in all situations for a specific application; a driver is no longer required for said application. The abovementioned four levels of automation according to the definition of the BASt correspond to the SAE levels 1 to 4 of the SAE J3016 standard (SAE—Society of Automotive Engineering). For example, the highly automated driving (HAF) according to the BASt corresponds to level 3 of the SAE J3016 standard. Furthermore, in SAE J3016, SAE level 5 is also provided as the highest level of automation which is not contained in the definition of the BASt. SAE level 5 corresponds to driverless driving, in the case of which the system can automatically manage all situations during the entire journey like a human driver; a driver is generally no longer required.

Known methods for specifying a setpoint (target) value for a control variable of a driver assistance system are vulnerable here to vehicle-internal and/or vehicle-external disruptive influences. Said disruptive influences can lead to it being possible for the actual behavior of the vehicle to be influenced only with difficulty by the specification of the setpoint value for the control variable.

It is an object of the invention to provide a driver assistance system and a method which at least increase the influence of the setpoint value for the control variable on the actual behavior of the vehicle.

The object is achieved by way of the features of the independent patent claims. Advantageous embodiments are described in the dependent claims. It is noted that, without the features of the independent patent claim or only in combination with a subset of the features of the independent patent claim, additional features of a patent claim which is dependent on an independent patent claim can form a separate invention which is independent of the combination of all the features of the independent patent claim and can be made the subject matter of an independent claim, a divisional application or a subsequent application. This applies in the same way to technical teachings which are described in the description and can form an invention which is independent of the features of the independent patent claims.

A first aspect of the invention relates to a driver assistance system for controlling a motor vehicle.

Here, the driver assistance system is set up to determine or to receive a setpoint value for a control variable of the motor vehicle.

The setpoint value is determined, in particular, in the case of trajectory planning, in the case of which a movement of the vehicle is planned for a fixed future time horizon. Here, for example, a longitudinal guidance/speed trajectory and/or a transverse guidance/steering trajectory can be determined.

Moreover, the driver assistance system is set up to determine or to receive an actual value for the control variable of the motor vehicle. For this purpose, for example, sensors of the motor vehicle can be evaluated.

In a manner which is dependent on a deviation between the setpoint value for the control variable and the actual value for the control variable, the driver assistance system determines a correction variable for decreasing the deviation between the setpoint value for the control variable and the actual value for the control variable. The deviation can be, in particular, the consequence of vehicle-internal or vehicle-external disruptive influences. For example, a performance limit of a drive of the motor vehicle in the case of uphill driving can lead to the actual speed of the motor vehicle not reaching the setpoint speed of the motor vehicle.

Moreover, the driver assistance system is set up to compare the correction variable with a first threshold value, and to at least limit a future change of the setpoint value for the control variable, which future change increases the deviation between the setpoint value for the control variable and the actual value for the control variable, in a manner which is dependent on the comparison of the correction variable with the first threshold value.

In particular, the driver assistance system is set up to at least limit the change of the setpoint value for the control variable if the correction variable is greater than or greater than or equal to the first threshold value.

In one advantageous embodiment, the driver assistance system is set up to at least limit the future change of the setpoint value for the control variable if the setpoint value for the control variable is greater than the actual value for the control variable, and the correction variable is greater than or greater than or equal to the first threshold value.

Here, the invention is based on the finding that the disruptive influence which leads to the deviation between the setpoint value for the control variable and the actual value for the control variable exists only in one "direction". If, for example, the control variable is the vehicle speed and the disruptive influence is a performance limit of the drive of the motor vehicle being reached, the drive does not prevent the motor vehicle from reaching the setpoint value for the speed if said setpoint value for the speed is set to or below the current actual value of the speed.

In a further advantageous embodiment, the driver assistance system is set up to at least limit the future change of the setpoint value for the control variable in a manner which is dependent on the comparison of the correction variable for a predefined time duration, for example for the time duration of a planning horizon of trajectory planning of the motor vehicle.

In a further advantageous embodiment, the driver assistance system is set up to compare the correction variable with a second threshold value, and to at least partially cancel the limiting of the future change of the setpoint value for the control variable in a manner which is dependent on the comparison of the correction variable with the second threshold value.

Here, the invention is based on the finding that the correction variable can serve as a measure of the degree of the deviation between the setpoint value for the control variable and the actual value for the control variable. Therefore, in particular in the case of a second threshold value being undershot, it can be extrapolated that the deviation between the setpoint value for the control variable and the actual value for the control variable is tolerable. In this case, the limiting of the future change of the setpoint value can be canceled.

In particular, therefore, the magnitude of the first threshold value is greater than the magnitude of the second threshold value.

In a further advantageous embodiment, the control variable is characteristic of a speed of the motor vehicle, and the correction variable is characteristic of an acceleration of the motor vehicle.

Here, for example, the control variable can be the speed of the motor vehicle or a variable which is formed from at least one wheel rotational speed. The correction variable can be, for example, the acceleration of the motor vehicle or a drive torque of the motor vehicle.

In a further advantageous embodiment, the control variable is characteristic of a steering angle of the motor vehicle, and the correction variable is characteristic of the derivative of the steering angle with respect to time.

In a further advantageous embodiment, the driver assistance system is set up to limit the future change of the setpoint value in such a way that the change of the setpoint value is prevented.

A second aspect of the invention relates to a method for controlling a motor vehicle.

One step of the method is determining or receiving of a setpoint value for a control variable of the motor vehicle.

A further step of the method is determining or receiving of an actual value for the control variable of the motor vehicle.

A further step of the method is determining of a correction variable for decreasing the deviation between the setpoint value for the control variable and the actual value for the control variable in a manner which is dependent on a deviation between the setpoint value for the control variable and the actual value for the control variable.

A further step of the method is comparing of the correction variable with a first threshold value.

A further step of the method is at least limiting of a future change of the setpoint value for the control variable, which future change increases the deviation between the setpoint value for the control variable and the actual value for the control variable, in a manner which is dependent on the comparison of the correction variable with the first threshold value.

The above comments with respect to the driver assistance system according to the invention in accordance with the first aspect of the invention also apply in a corresponding way to the method according to the invention in accordance with the second aspect of the invention. Advantageous exemplary embodiments of the method according to the invention which are not described explicitly at this point and in the patent claims correspond to the advantageous exemplary embodiments of the driver assistance system according to the invention which are described above or are described in the patent claims.

In the following text, the invention will be described on the basis of one exemplary embodiment with the aid of the appended drawings.

DETAILED DESCRIPTION OF THE DRAWINGS

Figure 1:
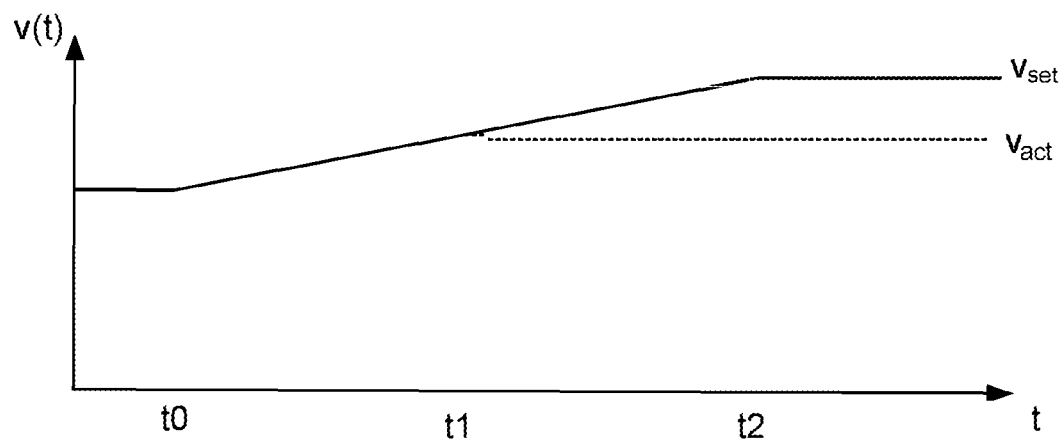
FIG. 1 shows one exemplary embodiment of exemplary profiles of a setpoint speed $v_{set}$ and an actual speed $v_{act}$ as setpoint value and actual value of a control variable of the motor vehicle.

FIG. 1 shows a time profile of a setpoint value $v_{set}$ for a control variable of the motor vehicle KFZ, which time profile has been determined or received by a driver assistance system FAS.

Here, the control variable is characteristic, for example, of a speed of the motor vehicle KFZ (for example, the speed of the motor vehicle KFZ itself), and the correction variable is characteristic of an acceleration of the motor vehicle KFZ (for example, the acceleration of the motor vehicle KFZ itself).

Moreover, FIG. 1 also shows a time profile of an actual value $v_{set}$ for the control variable of the motor vehicle KFZ, which time profile has likewise been determined or received by the driver assistance system FAS.

Here, the driver assistance system FAS is set up to determine, in a manner which is dependent on a deviation between the setpoint value $v_{set}$ for the control variable and the actual value $v_{act}$ for the control variable, to determine a correction variable a for decreasing the deviation between the setpoint value $v_{set}$ for the control variable and the actual value $v_{act}$ for the control variable.

Here, the setpoint value $v_{set}$ for the control variable and the actual value $v_{act}$ for the control variable are identical at the beginning of the exemplary embodiment for reasons of clarity. In practice, the two values are frequently different, solely on account of a time offset which can be due to the use of a controller.

At time t0, the setpoint value $v_{set}$ for the control variable begins to rise, it also being possible for the actual value $v_{act}$ the control variable to follow at this time.

At time t1, however, a deviation arises between the setpoint value $v_{set}$ for the control variable and the actual value $v_{act}$ for the control variable. The magnitude of the deviation rises up to time t2 and then remains constant.

Figure 2:
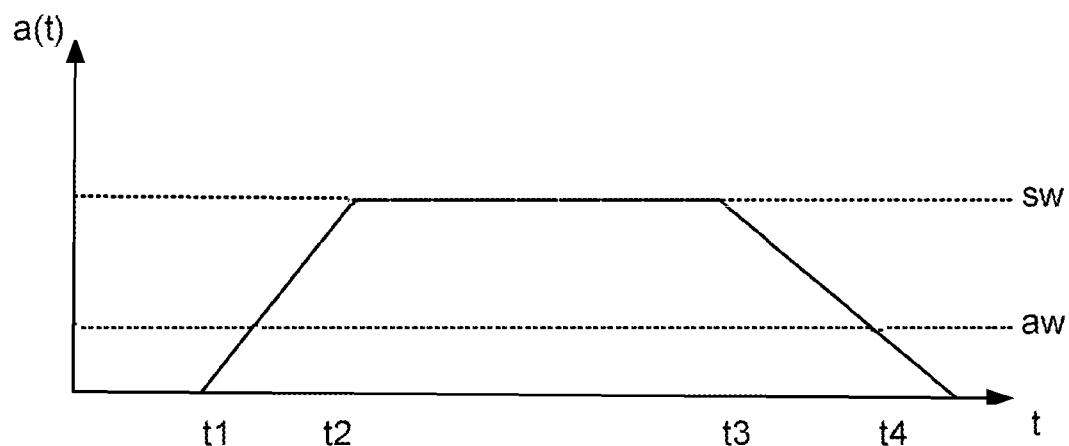
FIG. 2 shows one exemplary embodiment of an exemplary profile of a vehicle acceleration a as correction variable.

FIG. 2 shows a time profile of the correction variable a for the timescale (shown in FIG. 1) of the setpoint value $v_{set}$ for the control variable and the actual value $v_{act}$ for the control variable.

Since, up to time t1, the setpoint value $v_{set}$ for the control variable corresponds to the actual value $v_{act}$ for the control variable, the correction variable a has the value "zero" up to time t1.

The correction variable a also rises, however, with the deviation which arises from time t1 between the setpoint value $v_{set}$ for the control variable and the actual value $v_{act}$ for the control variable.

Here, the driver assistance system FAS is set up to compare the correction variable a with a first threshold value sw, and to at least limit a future change of the setpoint value $v_{set}$ for the control variable, which future change increases the deviation between the setpoint value $v_{set}$ for the control variable and the actual value $v_{act}$ for the control variable, in a manner which is dependent on the comparison of the correction variable a with the first threshold value sw.

In the present example, the correction variable a reaches the first threshold value sw at time t2. Therefore, from said time, a further increase of the setpoint value $v_{set}$ for the control variable is limited in such a way that the change of the setpoint value $v_{set}$ is prevented.

Here, in particular, the driver assistance system FAS is set up to at least limit the future change of the setpoint value $v_{set}$ for the control variable if the setpoint value $v_{set}$ for the control variable is greater than the actual value $v_{act}$ for the control variable, and the correction variable a is greater than or greater than or equal to the first threshold value sw.

Moreover, the driver assistance system FAS is set up to compare the correction variable a with a second threshold value aw, and to at least partially cancel the limiting of the future change of the setpoint value $v_{set}$ for the control variable in a manner which is dependent on the comparison of the correction variable a with the second threshold value aw.

In the present case, the correction variable a begins to fall again at time t3, and reaches the second threshold value aw at time t4.

Here, the magnitude of the first threshold value sw is greater than the magnitude of the second threshold value aw. Here, the basis is formed by the concept that, although the lower value of the second threshold value is still characteristic of a deviation between the setpoint value $v_{set}$ for the control variable and the actual value $v_{act}$ for the control variable, this can be, for example, a tolerable deviation.

Figure 3:
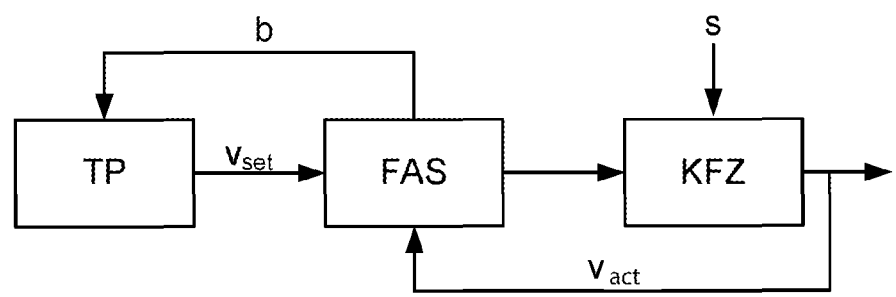
FIG. 3 shows a diagrammatic controller structure as one exemplary embodiment of the invention.

FIG. 3 shows a diagrammatic controller structure as one exemplary embodiment of the invention.

Here, a setpoint value $v_{set}$ for a control variable of the motor vehicle KFZ is determined by a trajectory planning unit TP and is transferred to the driver assistance system FAS.

Moreover, the driver assistance system FAS also receives an actual value $v_{act}$ for the control variable of the motor vehicle KFZ.

In a manner which is dependent on a deviation which arises as a result of a disruptive influence s between the setpoint value $v_{set}$ for the control variable and the actual value $v_{act}$ to the control variable, the driver assistance system FAS determines a correction variable a in order to decrease the deviation between the setpoint value $v_{set}$ for the control variable and the actual value $v_{act}$ for the control variable. The correction variable a is, for example, a manipulated variable of a controller.

Moreover, the driver assistance system is set up to compare the correction variable a with a first threshold value sw, and to at least limit a future change of the setpoint value $v_{set}$ for the control variable, which future change increases the deviation between the setpoint value $v_{set}$ for the control variable and the actual value $v_{act}$ for the control variable, in a manner which is dependent on the comparison of the correction variable a with the first threshold value sw, by a corresponding limiting signal b being transmitted to the trajectory planning unit.

What is claimed is:

1. A system for controlling a motor vehicle, comprising:
   at least one controller configured to:
   determine or receive a setpoint value for a control variable of the motor vehicle, wherein the control variable relates to a speed of the motor vehicle and/or a steering angle of the motor vehicle,
   determine or receive an actual value for the control variable of the motor vehicle,
   determine, in a manner which is dependent on a deviation between the setpoint value for the control variable and the actual value for the control variable, a correction variable for decreasing the deviation between the setpoint value for the control variable and the actual value for the control variable, wherein the correction variable relates to an acceleration of the motor vehicle and/or a derivative of the steering angle of the motor vehicle with respect to time,
   compare the correction variable with a first threshold value, and
   enter a limiting mode to at least limit a future change of the setpoint value for the control variable, which future change increases the deviation between the setpoint value for the control variable and the actual value for the control variable, in a manner which is dependent on the comparison of the correction variable with the first threshold value,
   compare the correction variable with a second threshold value,
   at least partially cancel the limiting mode to allow the future change of the setpoint value for the control variable in a manner which is dependent on the comparison of the correction variable with the second threshold value,
   control the speed of the motor vehicle and/or the steering angle of the motor vehicle in accordance with the control variable, and
   control the acceleration and/or the derivative of the steering angle with respect to time in accordance with the correction variable.

2. The system according to claim 1, wherein the at least one controller is further configured to:
   enter into the limiting mode to at least limit the future change of the setpoint value for the control variable when:
   (i) the setpoint value for the control variable is greater than the actual value for the control variable, and
   (ii) the correction variable is greater than or greater than or equal to the first threshold value.

3. The system according to claim 1, wherein the at least one controller is further configured to:
   enter into the limiting mode to at least limit the future change of the setpoint value for the control variable in a manner which is dependent on the comparison of the correction variable with the first threshold value for a predefined time duration.

4. The system according to claim 1, wherein
   the magnitude of the first threshold value is greater than the magnitude of the second threshold value.

5. The system according to claim 1, wherein the at least one controller is further configured to:
   enter into the limiting mode to limit the future change of the setpoint value in such a way that the change of the setpoint value is prevented.

6. A method for controlling a motor vehicle, the method comprising the steps of:
   determining or receiving, by at least one controller, a setpoint value for a control variable of the motor vehicle, wherein the control variable relates to a speed of the motor vehicle and/or a steering angle of the motor vehicle;

determining or receiving, by the at least one controller, an actual value for the control variable of the motor vehicle;

determining, by the at least one controller, a correction variable for decreasing deviation between the setpoint value for the control variable and the actual value for the control variable in a manner which is dependent on a deviation between the setpoint value for the control variable and the actual value for the control variable, wherein the correction variable relates to an acceleration of the motor vehicle and/or a derivative of the steering angle of the motor vehicle with respect to time;

comparing, by the at least one controller, the correction variable with a first threshold value;

entering into a limiting mode to at least limit, by the at least one controller, a future change of the setpoint value for the control variable, which future change increases the deviation between the setpoint value for the control variable and the actual value for the control variable, in a manner which is dependent on the comparison of the correction variable with the first threshold value;

comparing, by the at least one controller, the correction variable with a second threshold value, at least partially cancelling, by the at least one controller, the limiting mode to allow the future change of the setpoint value for the control variable in a manner which is dependent on the comparison of the correction variable with the second threshold value, controlling, by the at least one controller, the speed of the motor vehicle and/or the steering angle of the motor vehicle in accordance with the control variable, and controlling, by the at least one controller, the acceleration and/or the derivative of the steering angle with respect to time in accordance with the correction variable.

\* \* \* \* \*